June 23, 1970 P. RABE 3,516,775
LIGHTER
Filed May 15, 1968

Inventor:
Peter Rabe
By Michael S. Striker
Attorney

United States Patent Office 3,516,775
Patented June 23, 1970

3,516,775
LIGHTER
Peter Rabe, Muhlheim am Main, Germany, assignor to Heinrich Maltner G.m.b.H., Offenbach am Main, Germany
Filed May 15, 1968, Ser. No. 729,221
Claims priority, application Germany, June 13, 1967, N 74,370
Int. Cl. F23d 13/24
U.S. Cl. 431—344    13 Claims

ABSTRACT OF THE DISCLOSURE

A fuel tank for gas lighters comprises a housing of synthetic plastic material which consists of two sections. Each section includes a peripheral wall portion and at least one transverse wall portion. The peripheral wall portions are joined along a line located in a predetermined plane and together define an internal fuel chamber. The transverse wall portions together define an internal partition extending transversely of the plane and provided with a recess also extending transversely of the plane so that the two compartments into which the partition subdivides the fuel chamber, communicate with one another.

BACKGROUND OF THE INVENTION

The present invention relates generally to a lighter, and more particularly to a gas lighter. Still more particularly the present invention relates to a fuel tank for lighters and specifically for gas lighters.

It is well known that the fuel tank of gas lighters, that is lighters using liquified gas as fuel, must at times be capable of withstanding an internal gas pressure as high as 10 atmospheres or even more. This may for instance occur on heating and consequent expansion of the gas stored in the tank. To be able to withstand such internal pressure it is either necessary that the wall of the tank be made very thick, or that it be reinforced by reinforcing walls. Evidently, increased wall thickness results in increased weight and in increased overall dimensions of the lighter and it is therefore preferred to utilize reinforcing walls in the interior of the fuel tank, particularly in small and rather flat pocket lighters.

Of course, these reinforcing walls which extend transversely of the interior of the fuel tank subdivide this interior into two or more compartments which obviously must communicate with one another so that the gaseous fuel may be introduced into all such compartments through a single inlet valve and may be withdrawn from all such compartments through a single burner outlet valve. One fuel tank of this type which is known to me consists of synthetic plastic material and is constructed as a container having an open bottom side and transversely extending reinforcing walls. A bottom wall is then welded to the container to close the open bottom side and the filling valve is mounted in the bottom wall. In one construction of this fuel tank which is known to me each of the transversely extending reinforcing walls is provided with two vertically superposed openings. When this tank is filled, gas will pass from one chamber to the next adjacent chamber through one of the openings whereas the gas is displaced from the adjacent chamber to the other opening into the first-mentioned chamber. This type of tank is capable of fulfilling the ordinary requirements for gas-fueled lighters, but it is very difficult to manufacture because it is either necessary to mold the tank without the openings in the partition walls and to subsequently provide these openings in formal bores, or to provide mold inserts which must later be removed to create the openings. Both possibilities are time consuming and expensive.

This tank is also known in another construction wherein the partition walls terminate a short distance above the bottom wall. In this case, however, there exists the danger that the tank might be completely filled with liquified gas, for instance if the tank is filled in cold condition, and that the tank will rupture in response to a relatively small temperature increase because of the high coefficient expansion of the gas. Furthermore, the fact that the partition walls are not connected with the bottom wall reduces the stiffness which can be obtained.

It is therefore a general object of the present invention to overcome the aforementioned disadvantages.

A more particular object of the invention is to provide a fuel tank, particularly for use in lighters utilizing gaseous fuel, which can be manufactured very simply and inexpensively, which is very strong and resistant to breakage, and which provides proper filling of the fuel chamber to the maximum permissible extent but precludes dangerous overfilling beyond this permissible extent.

SUMMARY OF THE INVENTION

In accordance with one feature of my invention I provide such a fuel tank which comprises a housing of synthetic plastic material consisting of two sections each of which includes a peripheral wall portion and at least one transverse wall portion. The peripheral will portions are joined together along a line located in a predetermined plane and they surround an internal fuel chamber. The transverse wall portions together define an internal partition which extends transversely of the plane and subdivides the fuel chamber into at least two compartments. The housing is further provided with a socket adapted to accommodate a fuel inlet valve and communicating with one of the aforementioned compartments and the partition is provided with a recess which extends transversely of the aforementioned plane so that the compartments communicate with one another.

The fact that one of the transverse wall portions is located in that housing section in which the socket for the inlet valve or filling valve is also provided, assures that vapor spaces will remain in the individual compartments above the level of the liquified gaseous fluid so that, if the fluid expands in response to a temperature increase, it can expand into the spaces and bursting of the tank is prevented. Inasmuch as, in accordance with the present invention, the recess extends transversely of the plane in which the two sections are joined, that is extends inwardly from the line along which the transverse wall portions abut one another, makes it possible to provide such recess in a most simple manner during molding of these sections without any need for utilizing inserts which must be later removed, or resorting to other expedients, or to subsequently provide the openings by drilling through the transverse wall portions.

In accordance with a further feature of my invention the two transverse wall portions need not abut when the two sections are joined together and the slot existing between them in this manner may be provided with a widened portion by providing the recess in one or the other of the two wall portions. Again, the two wall portions may abut and the recess may be provided in both of them extending to opposite sides of their plane of abutment or only to one side thereof. The recess, or the slot existing between two nonabutted transverse wall portions, may have a width at which is at most equal to one-half of the total width of the two transverse wall portions together. If the two sections are joined in a plane which will normally be horizontal when the lighter utilizing the novel tank is in its normal horizontal operating position, then the construction of the slot or recess such that its width does not exceed one-half of the total width of the transverse wall portions, each one of which of course extends over the entire width of the fuel chamber, assures that there will always be sufficient abutment between the two wall portions to provide good reinforcement for the peripheral wall portions. Also, the non-recessed parts of the transverse wall portions will constitute with the associated peripheral wall portion a T-shaped cross sectional outline which serves to stiffen the peripheral wall portion against deformation under interior pressure.

It is advantageous if the non-recessed portion of that transverse wall portion associated with the section in which the fuel inlet valve is to be mounted, extends over between substantially 10 and 20% of the inner height of the fuel chamber, advantageously on the order of 15%.

It will be appreciated, of course, that the height of the recess must be adequate so that liquid gas can move through it from one chamber into the adjoining chamber while vapor will simultaneously be displaced from the adjoining chamber into the one chamber through the same recess. On the other hand, it is clear that the transverse partition must also fulfill its reinforcing function. I have found that it is possible to obtain optimum results if the non-recessed part of that wall portion which is located in the section which does not contain the fuel inlet valve, extends over approximately one-half of the inner height of the fuel chamber. A range of between substantially 40 and 60% of this inner height is acceptable to obtain optimum results as concerns the size of the recess as well as the reinforcement of the peripheral wall portion, particularly in the region of the middle of the tank where the latter will obviously be most prone to deformation under the influence of interior pressures.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
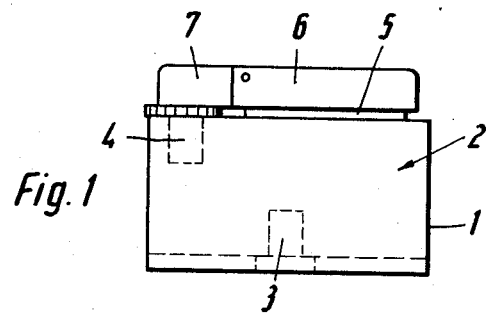
FIG. 1 is a schematic side-elevational view of a lighter including the novel invention.

Discussing now the drawing in detail it will be seen that in FIG. 1 I have illustrated diagrammatically a lighter having a housing 1 wherein there is arranged a fuel tank for gaseous fuel, this tank consisting of synthetic plastic material. A filling valve for the fuel is identified with reference numeral 3 and is screw fitted into the tank 2 from the bottom thereof and a burner valve 4 is similarly screw fitted into the tank but at the top side thereof. A support 5 for the ignition arrangement is also secured at the top of the tank. A push button 7 is provided which, when depressed, will result in an opening of the cap which overlies the ignition arrangement and the burner valve 4. Simultaneously, this movement of the push button will result in the turning of the spark wheel (not illustrated) and in opening of the burner valve so that gas may issue therefrom. This operation of the lighter is of course already known and is briefly outlined here only for clarity.

Figure 2:
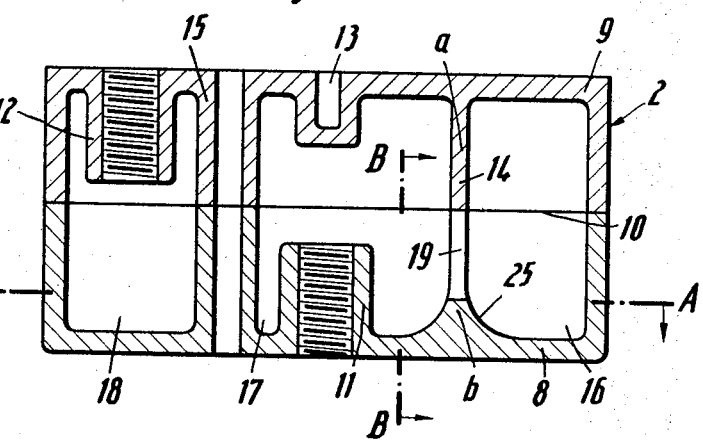
FIG. 2 is a vertical longitudinal section through a fuel tank in accordance with my invention.

FIG. 2 shows the novel tank 2 consists of synthetic plastic material and, in accordance with the present invention, is comprised of two hollow shells or sections 8 and 9. The lower section 8 and the upper section 9 are fluid-tightly connected with one another, for instance by welding, along a line of separation 10 located in a predetermined plane which here will be seen to be a horizontal plane when the lighter is in the position shown in FIG. 1. The lower section 8 comprises a socket 11 and the upper section 9 comprises a socket 12 which respectively are intended to accommodate the fuel inlet valve 3 and the burner or fuel outlet valve 4. A blind bore or a blind passage 13 is also provided in the upper section 9 and may serve to accommodate a screw or other fastener (not illustrated) for securing the ignition mechanism to the tank 2.

Figure 3:
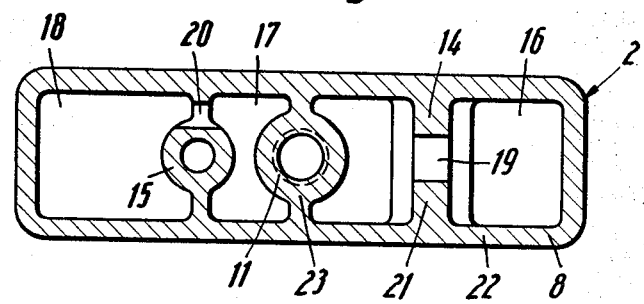
FIG. 3 is a section taken on the line A—A of FIG. 2.

As FIGS. 2 and 3 shows, the tank 2 is subdivided into three compartments 16, 17 and 18 by provision of two partition walls 14 and 15. In the illustrated embodiment the partition wall 15 is so constructed as to define a tube which may in known manner accommodate a flint and the biasing spring therefor, neither of which are illustrated. In accordance with the invention the partition walls 14 and 15 extend in the upper section 9, that is to one which does not accommodate the fuel inlet valve, with their portions $a$ to the line of sepation 10. This results in good reinforcement of the tank, particularly at the midheight thereof.

Figures 4, 5:
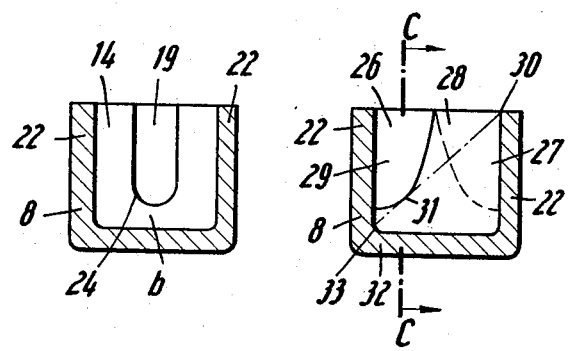
FIG. 4 is a section taken on the line B—B of FIG. 2.
FIG. 5 is a section corresponding to the view of FIG. 4 but illustrating another embodiment.

In the embodiment of FIGS. 2–4 the partition walls 14 and 15 are provided in the lower section 8, that is the section which accommodates the fuel inlet valve, with vertical cut-outs or slots 19 and 20 which provide communication between the compartments 16, 17 and 18. This leaves non-recessed or non-apertured parts $b$ for the partition walls 14 and 15 in the section 8, and these parts $b$ have a height corresponding to approximately 15% of the height of the interior fuel chamber. From this it follows that the length of the slots 19 and 20 is substantial, that is in the illustrated embodiment it corresponds to almost half the height of the fuel chamber so that adequate space is available for gaseous fluid and vapor to pass through the slots simultaneously in opposite directions.

As clearly shown in FIG. 3, the slot 19 is located centrally intermediate the side walls of the tank in the partition wall 14; it has a width corresponding to substantially 40% of the width of the fuel chamber, that is substantially 40% of the distance between the opposed side walls bounding the chamber. This leaves at opposite sides of the slot 19 the wall portions 21 which define, together with the adjacent portions of the side walls 22, respective T-shaped cross sectional outlines, a configuration which guarantees high bending resistance under pressure. To further increase the reinforcement of the lower section 8 to such bending pressure the socket 11 (compare FIG. 2) is connected by portions 23 (compare FIG. 3) with the side walls 22 and thus constitutes an additional transverse wall portion. It is advantageous that this additional transverse wall portion consisting of the socket 11 and the wall portion 23 be partially overlapped with the slot 19 in its height, as clearly shown in FIG. 2.

With this construction the side walls 22 are well reinforced, particularly by the wall portions 21 of the partition wall 14. This leaves, as the wall portions subjected to maximum stress, the wall portion surrounding the end 24 of the slot 19. In accordance with the invention this slot is therefore rounded at its end (as seen in FIG. 4) and in this region the partition wall 14 is further provided with a material accumulation 25, that is thickened in conical or parabolic shape from the region of the recess to the bottom wall of the section 8 as shown in FIG. 2.

To fill the tank thus far described, the lighter incorporating the tank is inverted so that the section 8 faces upwardly. Liquified gas is now introduced into the interior of the tank 2 in conventional manner through the fuel inlet valve 3 which is installed in the socket 11 in a manner which requires no further description because it is of no importance in the present invention. The liquified gas thus introduced will first rise in the chamber 17 to the line 10 and will then flow through the slots 19 and 20 into the compartments 16 and 18. Overfilling is prevented, however, because of the wall part *b* in the interior of the fuel chamber. To remove gas, that is to withdraw it for operation of the lighter, the burner valve 4 is opened in conventional manner. At this time, the lighter will, of course, be substantially in the position shown in FIG. 1, that is the section 8 will be the lowermost section again. Gas is thus withdrawn from the compartment 18 with the result that additional gas will flow through the slots 19 and 20 into the compartment 18 from the compartments 16 and 17. The fact that the lighter will inevitably be subjected to shaking and similar motions during use, assures that the supply of the gas from the compartments 16 and 17 into the compartment 18 cannot be precluded by gas trapped in the upper portions of the compartments 16 and 17.

Figure 6:
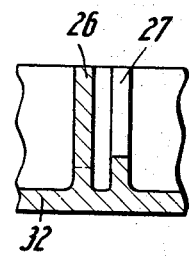
FIG. 6 is a fragmentary section taken on the line C—C of FIG. 5.

The embodiment illustrated in FIGS. 5 and 6 corresponds substantially to that of FIGS. 2–4. It differs therefrom in that one of the transverse partition wall 14 is omitted with two transverse partition walls 26 and 27, arranged side by side, being substituted for it. This is shown most clearly in FIG. 5. It will be seen that the transverse walls 26 and 27 are provided with recesses 28, 29 which are offset with respect to the longitudinal plane of symmetry of the tank and which are so configurated that a straight line extending from a point 30 at one side wall 22 of the tank in the region of the upper edge of the recess 29 and contacting the recess 29 at the point 31, will intersect the bottom wall 32 on the other side of the longitudinal plane of symmetry, or else the opposite side wall 22. This point of intersection is identified with reference numeral 33 in the illustrated embodiments of FIGS. 5 and 6. The purpose of this construction is to assure that, when the internal pressure of the liquified gas in the tank deflects the right-hand side wall 22 of the section 8 in an outward direction, these stresses are absorbed by the transverse wall 27 and channelled to a significant extent as tensile stresses to the floor 32 or the oppositely located side wall 22. Of course, the transverse wall 26 has the same purpose with reference to the left-hand side wall 22.

This construction is of particular importance and advantage if the wall thickness of the fuel tank is to be rather small, and it will be appreciated that the thickening of the partition wall 14 in the region of the end 24 of the slot 19, as discussed above, is provided for the same purpose, that is to reinforce the junction of the bottom wall with the transverse partition wall 14 when the wall thickness is rather small.

It will be understood that each of the elements described above, or two or more together, may also find a useful application in other types of constructions differing from the types described above.

While the invention has been illustrated and described as embodied in a fuel tank for lighters, particularly those utilizing gaseous fuel, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. As a novel article of manufacture, a fuel tank for lighters, particularly for gas lighters, comprising a housing of synthetic plastic material consisting of two shell-shaped sections having respective open sides facing one another and being bounded by edge faces which abut each other, said sections each including a bottom wall portion, a peripheral wall portion extending from said bottom wall portion, and at least one transverse wall portion extending from said bottom wall portion at least substantially to the respective edge face, said peripheral wall portions being joined together along a line located in the plane of the abutting edge faces and surrounding an internal fuel chamber, said transverse wall portions together defining an internal partition extending transversely of said plane and subdividing said fuel chamber into at least two compartments, said housing being further provided with a socket adapted to accommodate a fuel inlet valve and communicating with one of said compartments and said partition being provided with a recess extending transversely of said plane so that said compartments communicate with one another.

2. An article as defined in claim 1, said partition having a predetermined width in direction transversely of said plane, and wherein said recess has a breadth in said predetermined direction which is a fraction of said predetermined width.

3. An article as defined in claim 2, wherein said breadth of said recess is at most equal to one half of said width.

4. An article as defined in claim 1, wherein said plane bisects said fuel chamber substantially centrally thereof.

5. An article as defined in claim 2, wherein said plane is substantially horizontal when said fuel tank is in the normal operating position assumed by a lighter with which it is intended to be used, said sections including a top section and a bottom section and said socket being provided in one of said sections.

6. An article as defined in claim 5, wherein said recess extends at least in the transverse wall portion associated with said one section and wherein the height of the non-recessed part of the transverse wall portion of said one section corresponds to between 10% and 20% of the height of said fuel chamber.

7. An article as defined in claim 6, wherein the height of the non-recessed part of the transverse wall portion of said one section corresponds to 15% of the height of said fuel chamber.

8. An article as defined in claim 6, wherein the height of the non-recessed part of the transverse wall portion associated with the other of said section corresponds to substantially 50% of the height of said fuel chamber.

9. An article as defined in claim 5, said one section being provided with an additional transverse wall portion extending towards said plane, said socket constituting a part of said additional transverse wall portion.

10. An article as defined in claim 5, wherein said recess is slot-shaped and has an end portion adjacent the peripheral wall portion of said one section, and wherein said end portion of said recess is rounded.

11. An article as defined in claim 5, wherein the thickness of the transverse wall portion of said one section increases in direction from said recess towards the peripheral wall portion of said one section.

12. An article as defined in claim 5, wherein said thickness is at a maximum at the juncture of said transverse wall portion and said peripheral wall portion of said one section.

13. An article as defined in claim 5, wherein at least said transverse wall portion of said one section includes two discrete parts respectively extending across said fuel chamber from opposite lateral sides thereof and end being provided with a cut-out, said cut-outs being offset relative to one another and to opposite sides of a longitudinal plane of symmetry of said one section in such a manner that said recesses do not extend beyond such plane of symmetry and do not overlap one another.

References Cited

UNITED STATES PATENTS 3,154,935  11/1964  Ayres _____ 431—344

FOREIGN PATENTS 1,119,033  12/1961  Germany.
393,809  11/1965  Switzerland.

EDWARD G. FAVORS, Primary Examiner